(12) United States Patent
Zhang et al.

(10) Patent No.: US 10,705,238 B2
(45) Date of Patent: Jul. 7, 2020

(54) METHOD AND APPARATUS FOR PROCESSING SEISMIC DATA

(71) Applicant: PetroChina Company Limited, Beijing (CN)

(72) Inventors: Guangrong Zhang, Beijing (CN); Fusen Xiao, Beijing (CN); Qi Ran, Beijing (CN); Shirong Zhang, Beijing (CN); Yi Yu, Beijing (CN); Qi Liao, Beijing (CN); Bo Ma, Beijing (CN); Han Liang, Beijing (CN); Kang Chen, Beijing (CN); Xuan Zhang, Beijing (CN); Xiaomin Lu, Beijing (CN)

(73) Assignee: PETROCHINA COMPANY LIMITED, Beijing (CN)

( * ) Notice: Subject to any disclaimer, the term of this patent is extended or adjusted under 35 U.S.C. 154(b) by 321 days.

(21) Appl. No.: 15/882,779

(22) Filed: Jan. 29, 2018

(65) Prior Publication Data

US 2018/0149764 A1    May 31, 2018

Related U.S. Application Data

(63) Continuation of application No. PCT/CN2017/078498, filed on Mar. 29, 2017.

(30) Foreign Application Priority Data

Apr. 1, 2016  (CN) .......................... 2016 1 0204476

(51) Int. Cl.
*G01V 1/36* (2006.01)
*G01V 1/30* (2006.01)

(52) U.S. Cl.
CPC ............... *G01V 1/362* (2013.01); *G01V 1/30* (2013.01); *G01V 1/303* (2013.01); *G01V 1/36* (2013.01);

(Continued)

(58) Field of Classification Search
CPC ...................................................... G01V 1/362

(Continued)

(56) References Cited

U.S. PATENT DOCUMENTS

| | | | |
|---|---|---|---|
| 5,663,928 A | 9/1997 | De Bazelaire et al. | |
| 6,535,818 B1 * | 3/2003 | Baeten | G01V 1/362 |
| | | | 702/17 |

(Continued)

FOREIGN PATENT DOCUMENTS

| | | |
|---|---|---|
| CN | 1338640 A | 3/2002 |
| CN | 102540252 A | 7/2012 |

(Continued)

OTHER PUBLICATIONS

Bo Zhang et al:"Nonstretching NMO correction of prestack time-migrated gathers using a matching-pursuit algorithm." Geophysics Society of Exploration Geophysicists, US, vol.78:1, pp. U9-U18. XP001581525 (Jan. 1, 2013).

(Continued)

*Primary Examiner* — Ricky Ngon
(74) *Attorney, Agent, or Firm* — Loza & Loza, LLP; Michael F. Fedrick

(57) ABSTRACT

The present disclosure discloses a method and an apparatus for processing seismic data, and belongs to the field of geological surveys. The method comprises: stacking seismic trace gathers in a predetermined range among S seismic trace gathers after a Normal Move Out (NMO) correction processing to obtain a model trace, S being an integer; calculating a correlation coefficient of each seismic trace gather with the model trace, and selecting a K-th seismic trace gather with a maximum correlation coefficient; calculating an optimum point of each seismic trace gather from the K-th seismic trace gather to two sides orderly; and (Continued)

performing a residual NMO correction of the seismic trace gathers according to the optimum points.

6 Claims, 6 Drawing Sheets

(52) U.S. Cl.
CPC ...... *G01V 2210/52* (2013.01); *G01V 2210/57* (2013.01)

(58) Field of Classification Search
USPC .......................................................... 702/18
See application file for complete search history.

(56) References Cited

U.S. PATENT DOCUMENTS

| | | | |
|---|---|---|---|
| 2003/0187583 | A1 | 10/2003 | Martin et al. |
| 2008/0255762 | A1* | 10/2008 | Carvill ................. G01V 1/3808 702/18 |
| 2013/0121109 | A1* | 5/2013 | Baardman ............ G01V 1/3808 367/24 |
| 2015/0185349 | A1* | 7/2015 | Martinez ................ G01V 1/362 702/17 |

FOREIGN PATENT DOCUMENTS

| | | |
|---|---|---|
| CN | 102565857 A | 7/2012 |
| CN | 102879821 A | 1/2013 |
| CN | 102540252 B | 8/2014 |
| CN | 104181588 A | 12/2014 |
| CN | 104459794 A | 3/2015 |
| CN | 106226818 A | 12/2016 |
| WO | 2015106065 A1 | 7/2015 |

OTHER PUBLICATIONS

Guochang Liu et al: "Stacking seismic data using local correlation." Geophysics Society of Exploration Geophysicists, US, vol. 74:3 pp. V43-V48. XP001522546 (May 1, 2009).

European Patent App. 17773221.1, Extended European Search Report (dated Sep. 17, 2018).

Chinese Patent Office, First Office Action and Search Report for Application No. 201610204476.6, dated Nov. 16, 2017, 10 pages.

Zhou et al., The Processing Method and Application of the Residual Moveout NMO, Progress in Geophysics, 30(5):2349-2353 (2015), ISSN 1004-2903.

WIPO, International Search Report issued for counterpart Chinese International Application No. PCT/CN2017/078498, dated Jun. 1, 2017, 3 pages.

* cited by examiner

METHOD AND APPARATUS FOR PROCESSING SEISMIC DATA

CROSS-REFERENCE TO RELATED APPLICATIONS

This application is a continuation of and claims the benefit of priority under 35 U.S.C. § 120 from International Patent Application No. PCT/CN2017/078498, filed on Mar. 29, 2017 and entitled METHOD AND DEVICE FOR PROCESSING SEISMIC DATA, which claims the benefit of priority under 35 U.S.C. § 119 from Chinese Invention Patent No. CN201610204476.6, filed on Apr. 1, 2016 and entitled "Method and apparatus for processing seismic data". The entire content of the foregoing applications is incorporated herein by reference.

BACKGROUND

The seismic exploration technique explores the underground geological conditions by propagating an artificially excited seismic wave in the stratums. When a seismic wave excited at a certain place on the ground is propagated underground, reflection waves or refraction waves will be generated at stratum interfaces of different elasticity and returned to the ground surface. Special instruments may be used to record those waves and analyze the characteristics of the recorded waves (e.g., propagation time and vibration shapes of the waves), so as to accurately measure the depths and forms of those interfaces, and judge the lithology, physical properties and liquid-filled properties of the stratums.

Since the seismic record is noisy, usually the seismic reflection waves of the same point underground are excited and received at different positions, and a set of those seismic reflection wave from the same point is referred to as a seismic trace gather. By stacking seismic signals, the noise can be eliminated and the signal-to-noise ratio can be improved.

The same reflection point of seismic data collected in the field has different seismic reflection time which depends on the offset and the seismic propagation velocity, thus it is necessary to correct seismic record time of different offsets to a self-excitation and self-receiving seismic reflection time position, and this process is referred to as a Normal Move Out (NMO) correction, for the purpose of seismic signal stack.

However, the propagation velocity of the seismic wave is unknown, thus an NMO correction is usually realized by designing a series of seismic propagation velocities to perform an NMO correction processing of the seismic trace gather.

Since the volume of seismic data collected in the field is very huge, it is impossible for people to perform a velocity analysis for each seismic reflection point. Usually, a velocity analysis is performed for one seismic reflection point at an interval of several tens of traces, while a velocity of a trace gather without a velocity analysis is obtained by an interpolation of the velocity of the trace gather for which a velocity analysis has been performed. As the seismic velocities are not uniform, the interpolation velocities have certain errors more or less, and the NMO correction result cannot reach an ideal effect, thus it is difficult to correct the events of all of the seismic trace gathers into a horizontal state.

SUMMARY OF THE DISCLOSURE

In order to solve the problem of the prior art, the embodiments of the present disclosure provide a method and an apparatus for processing seismic data.

The embodiments of the present disclosure provide a method for processing seismic data, comprising: stacking seismic trace gathers in a predetermined range among S seismic trace gathers after a Normal Move Out (NMO) correction processing to obtain a model trace, S being an integer; calculating a correlation coefficient of each seismic trace gather with the model trace, and selecting a K-th seismic trace gather with a maximum correlation coefficient; calculating an optimum point of each seismic trace gather from the K-th seismic trace gather to two sides orderly; and performing a residual NMO correction of the seismic trace gathers according to the optimum points.

The embodiments of the present disclosure further provide an apparatus for processing seismic data, comprising a memory, a processor and a computer program stored in the memory and executable in the processor, wherein the processor performs the following operations when executing the computer program: stacking seismic trace gathers in a predetermined range among S seismic trace gathers after a Normal Move Out (NMO) correction processing to obtain a model trace, S being an integer; calculating a correlation coefficient of each seismic trace gather with the model trace, and selecting a K-th seismic trace gather with a maximum correlation coefficient; calculating an optimum point of each seismic trace gather from the K-th seismic trace gather to two sides orderly; performing a residual NMO correction of the seismic trace gathers according to the optimum points.

The embodiments of the present disclosure further provide a computer readable storage medium, wherein the computer readable storage medium stores a computer program which causes the processor to perform the following operations when being executed: stacking seismic trace gathers in a predetermined range among S seismic trace gathers after a Normal Move Out (NMO) correction processing to obtain a model trace, S being an integer; calculating a correlation coefficient of each seismic trace gather with the model trace, and selecting a K-th seismic trace gather with a maximum correlation coefficient; calculating an optimum point of each seismic trace gather from the K-th seismic trace gather to two sides orderly; performing a residual NMO correction of the seismic trace gathers according to the optimum points.

The technical solutions of the embodiments of the present disclosure achieve the following advantageous effects: by stacking a plurality of seismic trace gathers; calculating a correlation coefficient of each seismic trace gather with a model trace, and selecting a K-th seismic trace gather; calculating an optimum point of each seismic trace gather from the K-th seismic trace gather to two sides orderly; and performing a residual NMO correction of the seismic trace gathers according to the optimum points, this solution is combined with the prior art which realizes an NMO correction processing by analyzing the seismic propagation velocities, so that events of all of the model trace gathers are corrected into a horizontal state, thereby eliminating the errors caused by the interpolation in the prior art, and improving the accuracy of the prestack NMO correction.

It shall be appreciated that the above general description and the following specific embodiments are just exemplary and illustrative, rather than limitations to the scope of the present disclosure.

BRIEF DESCRIPTION OF THE DRAWINGS

In order to more clearly describe the technical solutions in the embodiments of the present disclosure, the drawings to be used in the description of the embodiments will be briefly introduced as follows. Obviously, the drawings in the following description just illustrate some embodiments of the present disclosure, and a person skilled in the art can obtain other drawings from them without paying any creative effort.

DETAILED DESCRIPTION OF THE EMBODIMENTS

In order that the objective, the technical solutions and the advantages of the embodiments of the present disclosure are clearer, the spirit of the revealed content of the present disclosure will be clearly explained as follows with reference to the drawings and detailed descriptions. After acquiring the embodiments of the present disclosure, any person skilled in the art can change and modify the technique taught by the present disclosure, without deviating from the spirit and range of the present disclosure.

Figure 1:
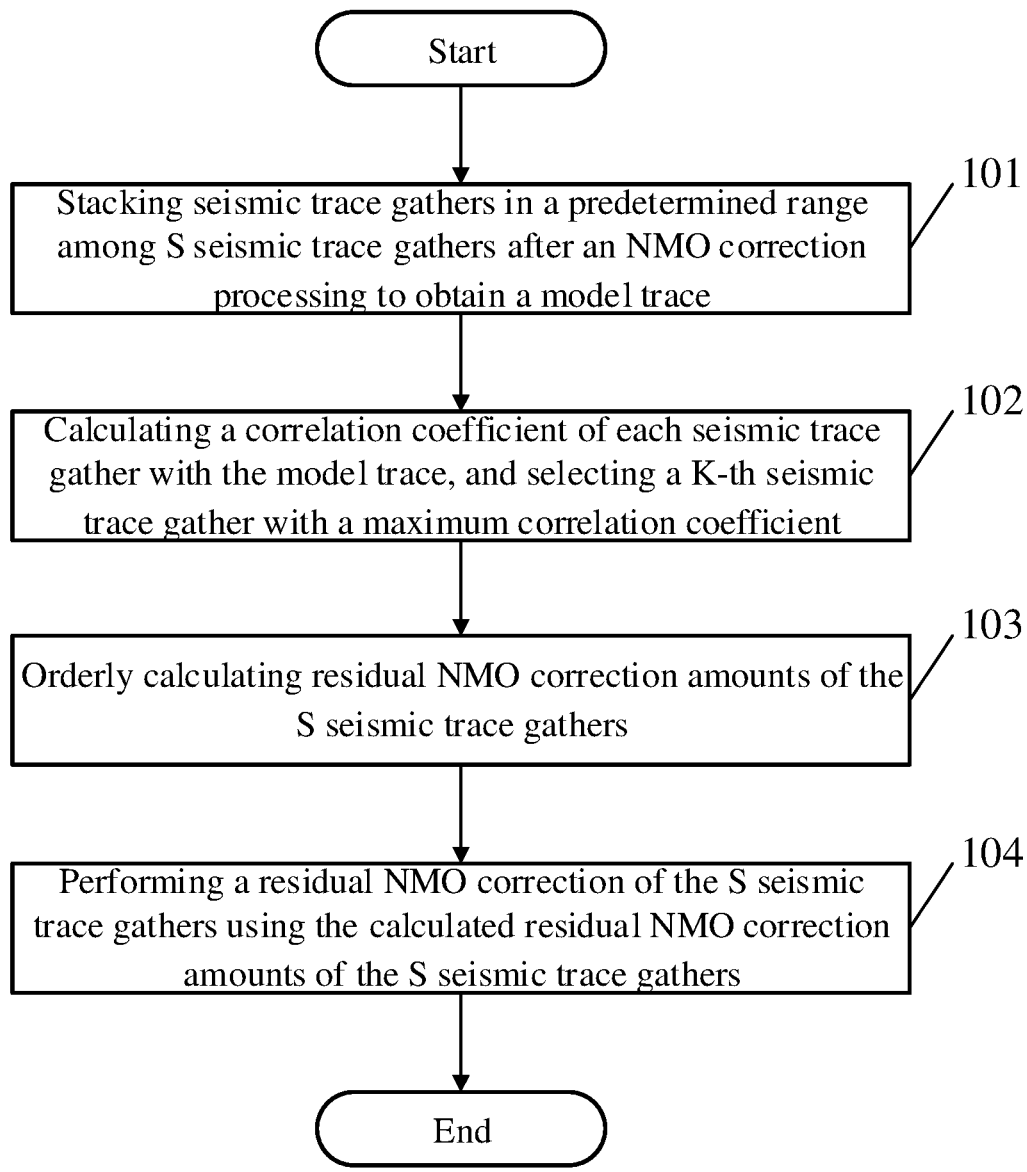
FIG. 1 is a flow diagram illustrating a method for processing seismic data provided by an embodiment of the present disclosure.

FIG. 1 illustrates a flow diagram of a method for processing seismic data provided by an embodiment of the present disclosure. As illustrated in FIG. 1, the method comprises:

step 101: stacking seismic trace gathers in a predetermined range among S seismic trace gathers after a Normal Move Out (NMO) correction processing to obtain a model trace, S being an integer.

In which, the S seismic trace gathers are all Common Reflection Point (CRP) trace gathers, and common midpoint (CMP) trace gathers are recorded based on different offsets to obtain trace gathers of different serial numbers.

Figure 3A:
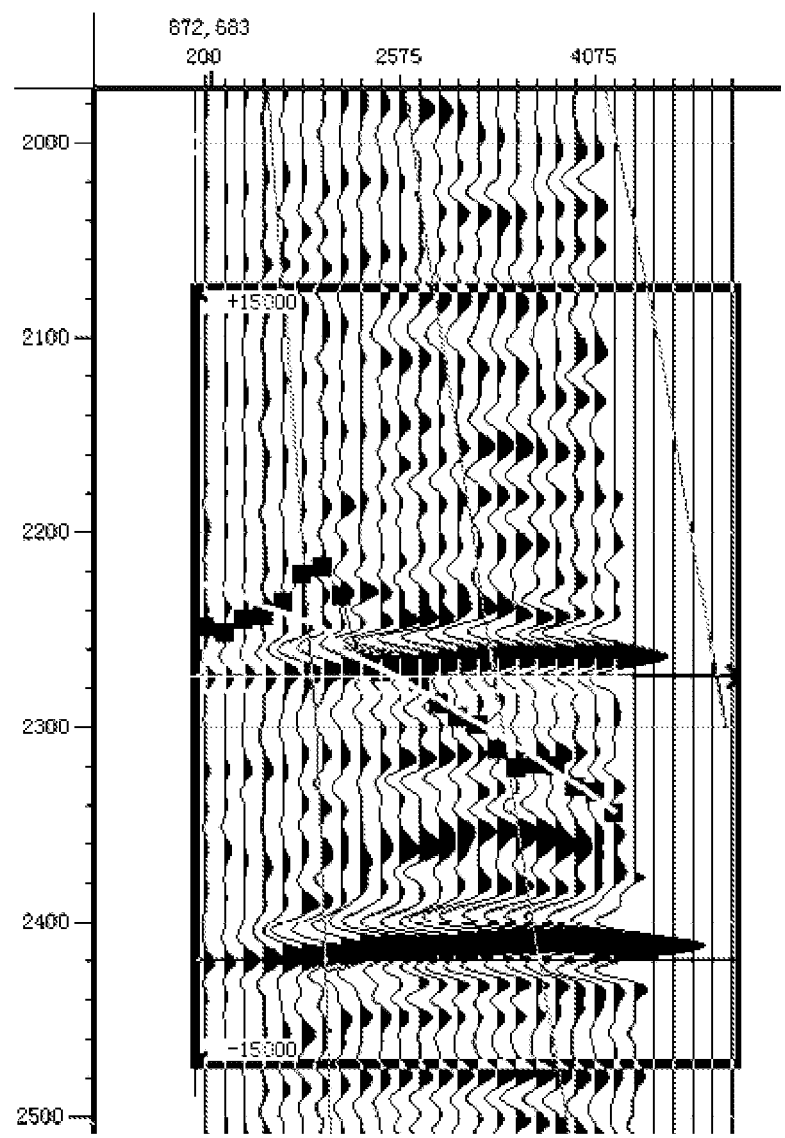
FIG. 3a is a schematic diagram illustrating seismic trace gathers of a conventional seismic processing provided by an embodiment of the present disclosure.

FIG. 3a illustrates a schematic diagram of seismic trace gathers, wherein a horizontal coordinate indicates an offset (unit: m), and each segment denotes an identical offset, while a vertical coordinate indicates time (unit: ms), and each segment denotes a seismic trace gather of an offset, which is a set of seismic traces of the offset.

In which, before step 101, the seismic trace gathers have been processed in the manner of an NMO correction that analyzes the seismic propagation velocities. In the embodiment, a series of seismic wave stack velocities are estimated to calculate seismic reflection time; a difference value between the seismic reflection time and seismic reflection time of a seismic trace gather with an offset of 0 as an NMO correction amount; an NMO correction is performed for original seismic trace gathers; and it is observed to determine that a current seismic wave stack velocity is appropriate when the trace gathers reach a horizontal state at that seismic wave stack velocity. The observation process is usually completed by the operator with his naked eyes.

The seismic reflection time may be calculated in the following formula.

$$t_x^2 = t_0^2 + \frac{x^2}{v_a^2}$$

$t_x$ denotes seismic reflection time, x denotes an offset, $t_0$ denotes seismic reflection time at which the offset is 0, and $v_a$ denotes a seismic wave stack velocity.

In which, the predetermined range may mean all or a part of the S seismic trace gathers.

stacking the seismic trace gathers means adding amplitudes of the seismic trace gathers of different serial numbers together based on sampling points.

Step 102: calculating a correlation coefficient of each seismic trace gather with the model trace, and selecting a K-th seismic trace gather with a maximum correlation coefficient.

Step 103: orderly calculating residual NMO correction amounts of the S seismic trace gathers.

In which, the residual NMO correction amount means a correction amount used for a further correction processing of the seismic data after a processing is performed in the manner of an NMO correction that analyzes the seismic propagation velocities.

In the embodiment, step 103 is realized in the following steps:

sliding a time window in a predetermined time range, calculating a correlation coefficient of a (K−1)-th seismic trace gather with the K-th seismic trace gather, selecting the time window as an optimum point when the correlation coefficient is the maximum, and taking a time shifting amount corresponding to the optimum point as a residual NMO correction amount of the (K−1)-th seismic trace gather, wherein K>1 and K is an integer;

sliding the time window in the predetermined time range, calculating a correlation coefficient of an M-th seismic trace gather with an (M+1) seismic trace gather, selecting the time window as an optimum point when the correlation coefficient is the maximum, and taking a time shifting amount corresponding to the optimum point as a residual NMO correction amount of the M-th seismic trace gather, wherein K−2≥M≥1 and M is an integer;

sliding the time window in the predetermined time range, calculating a correlation coefficient of a (K+1)-th seismic trace gather with the K-th seismic trace gather, selecting the time window as an optimum point when the correlation coefficient is the maximum, and taking a time shifting amount corresponding to the optimum point as a residual NMO correction amount of the (K+1)-th seismic trace gather;

sliding the time window in the predetermined time range, calculating a correlation coefficient of an (N+1)-th seismic trace gather with an N-th seismic trace gather, selecting the time window as an optimum point when the correlation coefficient is the maximum, and taking a time shifting amount corresponding to the optimum point as a residual NMO correction amount of the (N+1)-th seismic trace gather, wherein S−1≥N≥K+1 and N is an integer, and the time shifting amount corresponding to the optimum point is a difference value between seismic reflection time of a seismic trace gather (e.g., the (N+1)-th seismic trace gather herein) in the time window and seismic reflection time of a seismic trace gather with an offset of 0.

In which, seismic reflection time of a seismic trace gather in the time window may be an average value of seismic reflection time of respective seismic traces of the seismic trace gather at the optimum point, or seismic reflection time of any one of the seismic traces.

Step 104: performing a residual NMO correction of the S seismic trace gathers using the calculated residual NMO correction amounts of the S seismic trace gathers.

In which, the residual NMO correction means a further correction processing of the seismic data after a processing is performed in the manner of an NMO correction that analyzes the seismic propagation velocities.

In the embodiment of the present disclosure, by stacking a plurality of seismic trace gathers; calculating a correlation coefficient of each seismic trace gather with a model trace, and selecting a K-th seismic trace gather; calculating an optimum point of each seismic trace gather from the K-th seismic trace gather to two sides orderly; and performing a residual NMO correction of the seismic trace gathers according to the optimum points, this solution is combined with the prior art which realizes an NMO correction processing by analyzing the seismic propagation velocities, so that events of all of the model trace gathers are corrected into a horizontal state, thereby eliminating the errors caused by the interpolation in the prior art, and improving the accuracy of the prestack NMO correction.

Figure 2:
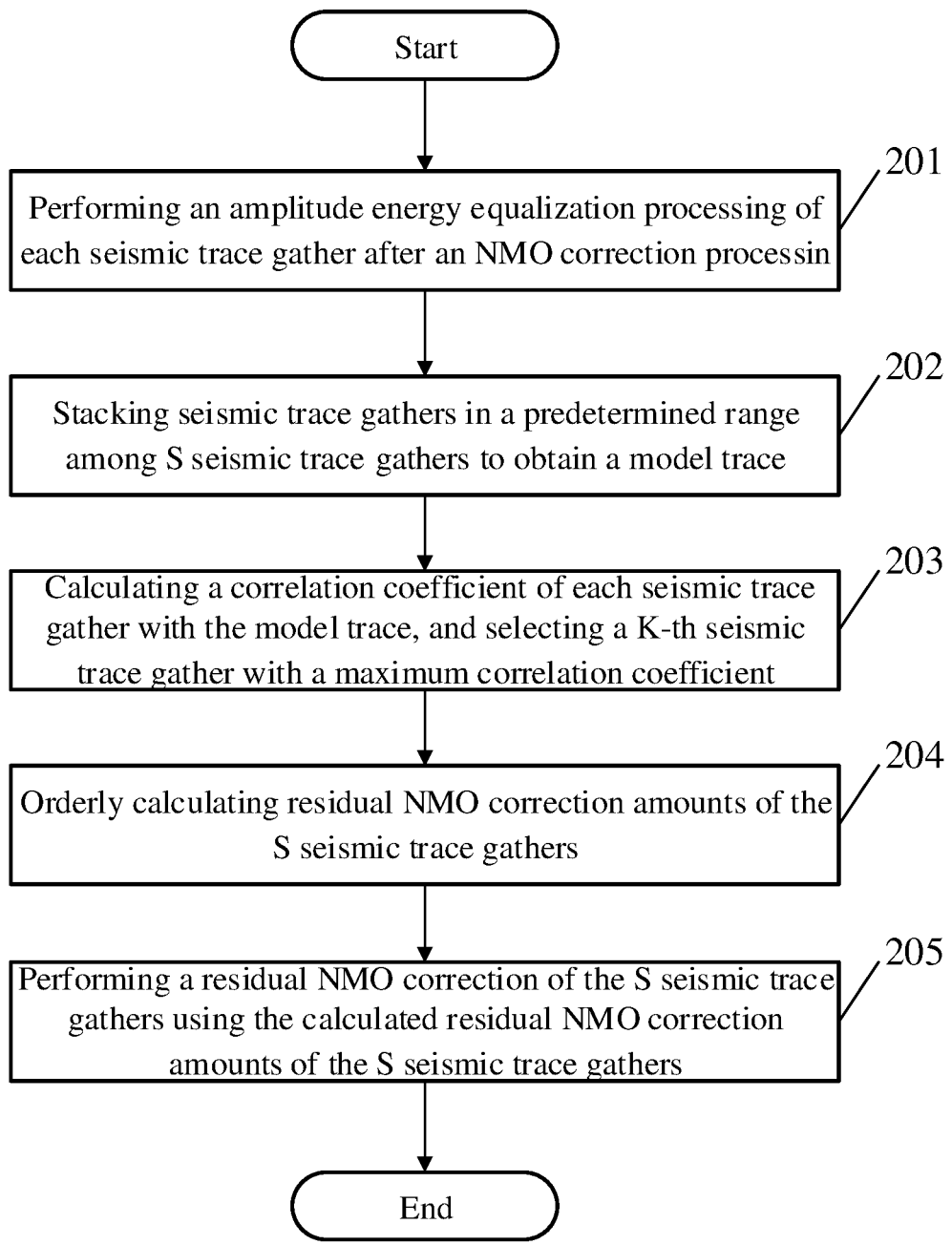
FIG. 2 is a flow diagram illustrating another method for processing seismic data provided by an embodiment of the present disclosure.

FIG. 2 illustrates a flow diagram of another method for processing seismic data provided by an embodiment of the present disclosure. As illustrated in FIG. 2, the method comprises:

Step 201: performing an amplitude energy equalization processing of each seismic trace gather after an NMO correction processing.

In which, the amplitude energy equalization processing of each seismic trace gather is performed in the following steps:

first step: counting an amplitude energy E0 in a predetermined time window range (e.g., 1000 to 3000 ms):

$$E0 = \frac{1}{Q}\left(\sum_{i=1}^{Q} \sqrt{\frac{1}{P}\sum_{j=1}^{P} a_j^2}\right)$$

In which, Q denotes the number of counted traces (total number of trace gathers), P denotes the number of sampling points, and $a_j$ denotes an amplitude value;

second step: calculating an amplitude energy E1 of each seismic trace gather:

$$E1 = \sqrt{\frac{1}{P}\sum_{j=1}^{P} a_j^2}$$

third step: calculating an amplitude equalization coefficient k of each seismic trace gather:

$$k = E0/E1;$$

fourth step: performing an amplitude equalization processing of each seismic trace gather using the amplitude equalization coefficient: $\overline{A}' = k\overline{A}$, wherein $\overline{A}$ denotes a sequence composed of amplitude values a of each seismic trace gather (amplitude values of a plurality of sampling points), and $\overline{A}$ denotes an amplitude value after the amplitude equalization processing.

In the embodiment, before step 201, the method further comprises:

1) exciting and recording seismic wave data with a controllable seismic source; 2) recording with the controllable seismic source and making an absorption analysis in a selected time window, to obtain an amplitude spectrum of shot points or receiver points in the selected time window; 3) realizing an NMO correction processing by analyzing seismic propagation velocities.

Step 202: stacking seismic trace gathers in a predetermined range among S seismic trace gathers to obtain a model trace, S being an integer.

In the embodiment, the following formula is employed to stack the seismic trace gathers in the predetermined range among the S seismic trace gathers after the NMO correction processing to obtain the model trace:

$$A_j = \sum_{i=m1}^{m2} a_{ij}$$

In which, m1 and m2 denote serial numbers of the seismic trace gathers, and $a_{ij}$ denotes an amplitude value of a j-th sampling point of an i-th trace; m1, m2, i and j are all positive integers, $1 \leq m1 < m2 \leq S$, $i \in [m1, m2]$.

In which, different serial numbers of the seismic trace gathers indicate that those seismic trace gathers are corresponding to different offsets; and the sampling points are selected from the amplitude spectrum at a predetermined time interval.

In which, the predetermined range [m1, m2] may be all or a part of the S seismic trace gathers.

In which, the amplitude value of a sampling point may be an average value of time positions of the seismic trace gather at the sampling point, or a value of any seismic trace of the seismic trace gather.

Step 203: calculating a correlation coefficient of each seismic trace gather with the model trace, and selecting a K-th seismic trace gather with a maximum correlation coefficient.

The following formula is employed to calculate a correlation coefficient of a model trace $\overline{A}$ with a seismic trace gather $\overline{B}$:

$$\overline{rx} = \frac{\sum_{j=1}^{n}(a_j - Aa)(b_j - Ba)}{\sqrt{\sum_{j=1}^{n}(a_j - Aa)^2 \sum_{j=1}^{n}(b_j - Ba)^2}}$$

In which, $\overline{rx}$ denotes a correlation coefficient of an x-th trace with the model trace, $a_j$ denotes an amplitude value of an j-th sampling point of the model trace $\overline{A}$, Aa denotes an average amplitude value of the model trace $\overline{A}$, $b_j$ denotes an amplitude value of an j-th sampling point of the seismic trace gather $\overline{B}$, Ba denotes an average amplitude value of the seismic trace gather $\overline{B}$, and n denotes the total number of sample points in the seismic trace gathers, wherein n, x and j are both positive integers, and $1 \leq x \leq S$.

Step 204: orderly calculating residual NMO correction amounts of the S seismic trace gathers.

In the embodiment, step 204 is realized in the following steps:

sliding a time window in a predetermined time range, calculating a correlation coefficient of a (K−1)-th seismic trace gather with the K-th seismic trace gather, selecting the time window as an optimum point when the correlation coefficient is the maximum, and taking a time shifting amount corresponding to the optimum point as a residual NMO correction amount of the (K−1)-th seismic trace gather, wherein K>1 and K is an integer;

sliding the time window in the predetermined time range, calculating a correlation coefficient of an M-th seismic trace gather with an (M+1) seismic trace gather, selecting the time window as an optimum point when the correlation coefficient is the maximum, and taking a time shifting amount corresponding to the optimum point as a residual NMO correction amount of the M-th seismic trace gather, wherein K−2≥M≥1 and M is an integer;

sliding the time window in the predetermined time range, calculating a correlation coefficient of a (K+1)-th seismic trace gather with the K-th seismic trace gather, selecting the time window as an optimum point when the correlation coefficient is the maximum, and taking a time shifting amount corresponding to the optimum point as a residual NMO correction amount of the (K+1)-th seismic trace gather;

sliding the time window in the predetermined time range, calculating a correlation coefficient of an (N+1)-th seismic trace gather with an N-th seismic trace gather, selecting the time window as an optimum point when the correlation coefficient is the maximum, and taking a time shifting amount corresponding to the optimum point as a residual NMO correction amount of the (N+1)-th seismic trace gather, wherein S−1≥N≥K+1 and N is an integer, and the time shifting amount corresponding to the optimum point is a difference value between seismic reflection time of a seismic trace gather (e.g., the (N+1)-th seismic trace gather herein) in the time window and seismic reflection time of a seismic trace gather with an offset of 0.

The optimum position of each seismic trace gather is orderly sought from the K-th trace, a correlation coefficient of each seismic trace gather with the model trace is calculated through a sliding point by point in the seismic trace gather, a position is selected as an optimum point in the seismic trace gather when the correlation coefficient is the maximum, and a time shifting amount corresponding to the optimum point is Δt. In the above calculation, firstly the selected K-th trace is taken as the model trace, while in subsequent calculations, a previous trace is taken as a model trace of a current trace in turn, e.g., an (M+1) trace is taken as a model trace of an M-th trace, and an N-th trace is taken as a model trace of an (N+1)-th trace.

In which, a correlation coefficient of a seismic trace gather with a model trace in a time window is calculated as follows:

$$\overline{rj} = \frac{(a_j - Aa)\sum_{j=1}^{n}(b_j - Ba)}{\sqrt{(a_j - Aa)^2 \sum_{j=1}^{n}(b_j - Ba)^2}}$$

In which, $\overline{rj}$ denotes a correlation coefficient of a seismic trace gather with a model trace in a time window where an j-th sampling point is located, $a_j$ denotes an amplitude value of an j-th sampling point in the model trace $\overline{A}$, Aa denotes an average amplitude value of the model trace $\overline{A}$ in the time window, $b_j$ denotes an amplitude value of an j-th sampling point in the seismic trace gather $\overline{B}$, and Ba denotes an average amplitude value of the seismic trace gather $\overline{B}$ in the time window, wherein j is a positive integer.

In which, the predetermined time range may be T0-dT to T1-dT, the length of the time window may be T (T0 to T1), and the specific values may be selected upon the actual demand. In the above calculation, two slides of the time window are overlapped with each other, so that the selected optimum point has an enough accuracy.

Step 205: performing a residual NMO correction of the S seismic trace gathers using the calculated residual NMO correction amounts of the S seismic trace gathers.

In the embodiment, a time shifting amount corresponding to an optimum point in each seismic trace gather is obtained as a correction amount Δt at first; next, the NMO correction amount is taken as Δt to correct each seismic trace gather.

In another embodiment of the present disclosure, a method for processing seismic data comprises: stacking seismic trace gathers in a predetermined range among S seismic trace gathers after an NMO correction processing to obtain a model trace, S being an integer; calculating a correlation coefficient of each seismic trace gather with the model trace, and selecting a K-th seismic trace gather with a maximum correlation coefficient; calculating an optimum point of each seismic trace gather from the K-th seismic trace gather to two sides orderly; and performing a residual NMO correction of the seismic trace gathers according to the optimum points.

In the embodiment, calculating an optimum point of each seismic trace gather from the K-th seismic trace gather to two sides orderly comprises: sliding a time window in a predetermined time range, calculating a correlation coefficient of a (K−1)-th seismic trace gather with the K-th seismic trace gather, selecting the time window as an optimal point when the correlation coefficient is the maximum, and taking a time shifting amount corresponding to the optimal point as a residual NMO correction amount of the (K−1)-th seismic trace gather, wherein K>1 and K is an integer; sliding the time window in the predetermined time range, calculating a correlation coefficient of an M-th seismic trace gather and an (M+1) seismic trace gather, selecting the time window as an optimal point when the correlation coefficient is the maximum, and taking a time shifting amount corresponding to the optimal point as a residual NMO correction amount of the M-th seismic trace gather, wherein K−2≥M≥1 and M is an integer; sliding the time window in the predetermined time range, calculating a correlation coefficient of a (K+1)-th seismic trace gather with the K-th seismic trace gather, selecting the time window as an optimal point when the correlation coefficient is the maximum, and taking a time shifting amount corresponding to the optimal point as a residual NMO correction amount of the (K+1)-th seismic trace gather; sliding the time window in the predetermined time range, calculating a correlation coefficient of an (N+1)-th seismic trace gather with an N-th seismic trace gather, selecting the time window as an optimum point when the correlation coefficient is the maximum, and taking a time shifting amount corresponding to the optimum point as a residual NMO correction amount of the (N+1)-th seismic trace gather, wherein S−1≥N≥K+1 and N is an integer, and the time shifting amount corresponding to the optimum point is a difference value between seismic reflection time of a seismic trace gather in the time window and seismic reflection time of a seismic trace gather with an offset of 0.

In the embodiment, performing a residual NMO correction of the seismic trace gathers according to the optimum points comprises: performing a residual NMO correction of the S seismic trace gathers using the calculated residual NMO correction amounts of the S seismic trace gathers.

Figure 3B:
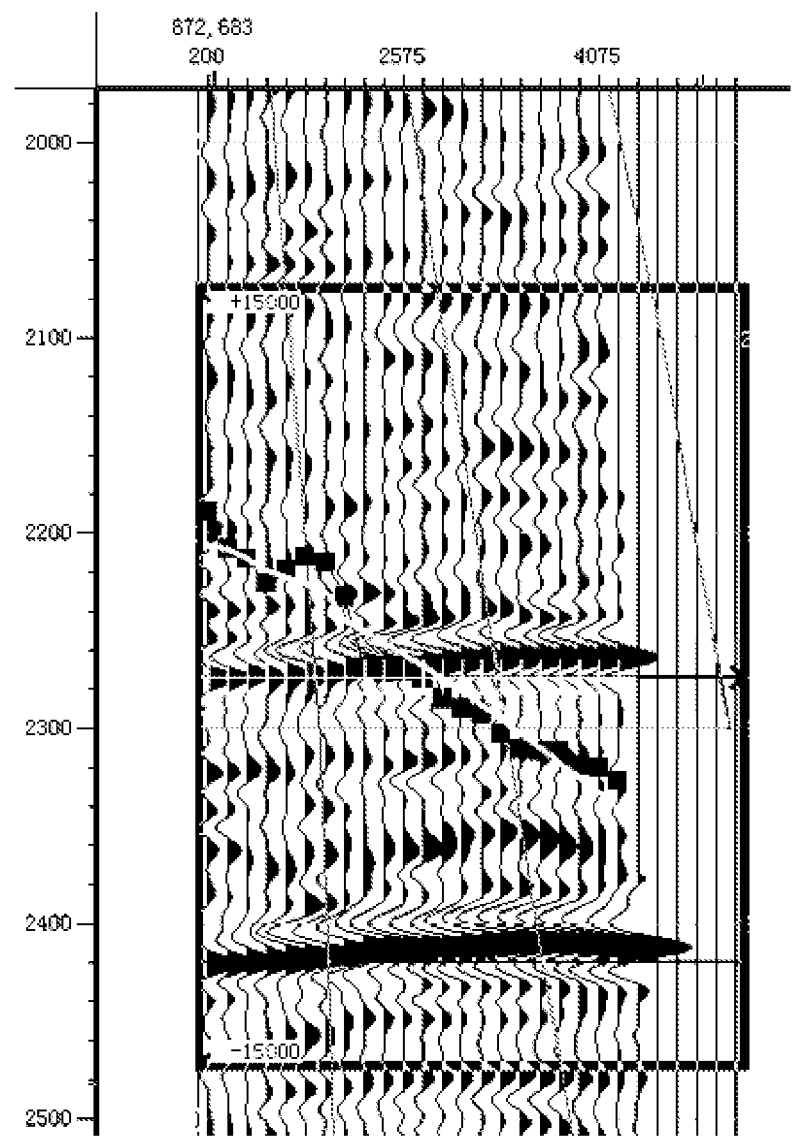
FIG. 3b is a schematic diagram illustrating seismic trace gathers after an amplitude energy equalization processing provided by an embodiment of the present disclosure.
Figure 3C:
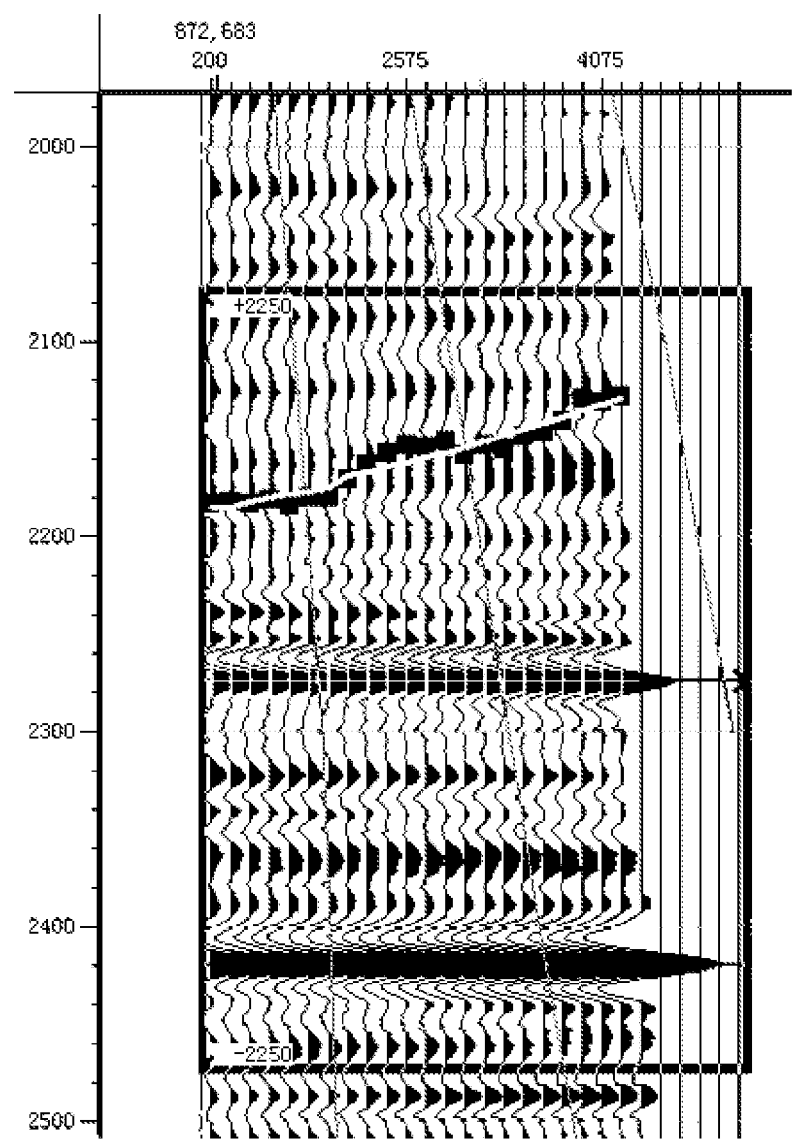
FIG. 3c is a schematic diagram illustrating seismic trace gathers after a residual NMO correction processing for FIG. 3b provided by an embodiment of the present disclosure.

Next, the effects of the method provided by the embodiment of the present disclosure are described as follows with reference to FIGS. 3a to 3c.

FIG. 3a illustrates seismic trace gathers of a conventional seismic processing (NMO correction), in which it is apparent that amplitude energy (black part) of a seismic trace gather having a smaller shot-geophone distance (left side) is significantly weaker (the black part has a smaller width) than amplitude energy of a seismic trace gather having a larger shot-geophone distance (right side), and such an amplitude energy distribution obviously does not coincide with the distribution characteristics of the actual seismic reflection amplitude energy. Thus, an amplitude energy equalization processing needs to be performed. FIG. 3b illustrates seismic trace gathers after an amplitude energy equalization processing. Since the events of the trace gathers are uneven, the variation characteristics of the amplitude along with the offset cannot be correctly represented just through the amplitude energy equalization processing, and a residual NMO correction processing of the model trace shall also be performed, so as to correct the events of the prestack trace gathers into a horizontal state (FIG. 3c).

In the embodiment of the present disclosure, by stacking a plurality of seismic trace gathers; calculating a correlation coefficient of each seismic trace gather with a model trace, and selecting a K-th seismic trace gather; calculating an optimum point of each seismic trace gather from the K-th seismic trace gather to two sides orderly; and performing a residual NMO correction of the seismic trace gathers according to the optimum points, this solution is combined with the prior art which realizes an NMO correction processing by analyzing the seismic propagation velocities, so that events of all of the model trace gathers are corrected into a horizontal state, thereby eliminating the errors caused by the interpolation in the prior art, and improving the accuracy of the prestack NMO correction; thus the quality of the seismic data stack result after the trace gather optimization is obviously improved or increased, which can more accurately describe the stratum construction, the lithology and the fluid property.

Figure 4:
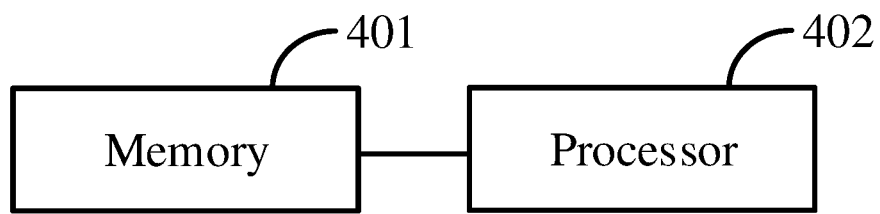
FIG. 4 is a structure diagram of an apparatus for processing seismic data provided by an embodiment of the present disclosure.

FIG. 4 illustrates a structure diagram of an apparatus for processing seismic data in an embodiment of the present disclosure. As illustrated in FIG. 4, the apparatus comprises a memory 401, a processor 402 and a computer program stored in the memory 401 and executable in the processor 402, wherein the processor 402 performs the following operations when executing the computer program:

stacking seismic trace gathers in a predetermined range among S seismic trace gathers after an NMO correction processing to obtain a model trace, S being an integer;

calculating a correlation coefficient of each seismic trace gather with the model trace, and selecting a K-th seismic trace gather with a maximum correlation coefficient;

sliding a time window in a predetermined time range, calculating a correlation coefficient of a (K−1)-th seismic trace gather with the K-th seismic trace gather, selecting the time window as an optimum point when the correlation coefficient is the maximum, and taking a time shifting amount corresponding to the optimum point as a residual NMO correction amount of the (K−1)-th seismic trace gather, wherein K>1 and K is an integer;

sliding the time window in the predetermined time range, calculating a correlation coefficient of an M-th seismic trace gather with an (M+1) seismic trace gather, selecting the time window as an optimum point when the correlation coefficient is the maximum, and taking a time shifting amount corresponding to the optimum point as a residual NMO correction amount of the M-th seismic trace gather, wherein K−2≥M≥1 and M is an integer;

sliding the time window in the predetermined time range, calculating a correlation coefficient of a (K+1)-th seismic trace gather with the K-th seismic trace gather, selecting the time window as an optimum point when the correlation coefficient is the maximum, and taking a time shifting amount corresponding to the optimum point as a residual NMO correction amount of the (K+1)-th seismic trace gather;

sliding the time window in the predetermined time range, calculating a correlation coefficient of an (N+1)-th seismic trace gather with an N-th seismic trace gather, selecting the time window as an optimum point when the correlation coefficient is the maximum, and taking a time shifting amount corresponding to the optimum point as a residual NMO correction amount of the (N+1)-th seismic trace gather, wherein S−1≥N≥K+1 and N is an integer, and the time shifting amount corresponding to the optimum point is a difference value between seismic reflection time of a seismic trace gather (e.g., the (N+1)-th seismic trace gather herein) in the time window and seismic reflection time of a seismic trace gather with an offset of 0;

performing a residual NMO correction of the S seismic trace gathers using the calculated residual NMO correction amounts of the S seismic trace gathers.

The embodiment of the present disclosure stacks a plurality of seismic trace gathers; calculates a correlation coefficient of each seismic trace gather with a model trace, and selects a K-th seismic trace gather; calculates an optimum point of each seismic trace gather from the K-th seismic trace gather to two sides orderly; and performs a residual NMO correction of the seismic trace gathers according to the optimum points. This solution is combined with the prior art which realizes an NMO correction processing by analyzing the seismic propagation velocities, so that events of all of the model trace gathers are corrected into a horizontal state, thereby eliminating the errors caused by the interpolation in the prior art, and improving the accuracy of the prestack NMO correction.

In the embodiment, the processor 402 further performs the following operations when executing the computer program:

performing an amplitude energy equalization processing of each seismic trace gather before stacking seismic trace gathers in a predetermined range among S seismic trace gathers after an NMO correction processing.

In the embodiment, the processor 402 further performs the following operations when executing the computer program:

counting an amplitude energy E0 in a predetermined time window range:

$$E0 = \frac{1}{Q}\left(\sum_{i=1}^{Q}\sqrt{\frac{1}{P}\sum_{j=1}^{P}a_j^2}\right)$$

In which, Q denotes the number of counted traces, P denotes the number of sampling points, and $a_j$ denotes an amplitude value;

calculating an amplitude energy E1 of each seismic trace gather:

$$E1 = \sqrt{\frac{1}{P}\sum_{j=1}^{P} a_j^2}$$

calculating an amplitude equalization coefficient k of each seismic trace gather: k=E0/E1;

performing an amplitude equalization processing of each seismic trace gather using the amplitude equalization coefficient: $\overline{A}'=k\overline{A}$, wherein $\overline{A}$ denotes a sequence composed of amplitude values a of each seismic trace gather (amplitude values of a plurality of sampling points), and $\overline{A}$ denotes an amplitude value after the amplitude equalization processing.

stacking the seismic trace gathers in the predetermined range among the S seismic trace gathers after the NMO correction processing to obtain a model trace, S being an integer;

calculating a correlation coefficient of each seismic trace gather with the model trace, and selecting a K-th seismic trace gather with a maximum correlation coefficient;

sliding a time window in a predetermined time range, calculating a correlation coefficient of a (K−1)-th seismic trace gather with the K-th seismic trace gather, selecting the time window as an optimum point when the correlation coefficient is the maximum, and taking a time shifting amount corresponding to the optimum point as a residual NMO correction amount of the (K−1)-th seismic trace gather, wherein K>1 and K is an integer;

sliding the time window in the predetermined time range, calculating a correlation coefficient of an M-th seismic trace gather with an (M+1) seismic trace gather, selecting the time window as an optimum point when the correlation coefficient is the maximum, and taking a time shifting amount corresponding to the optimum point as a residual NMO correction amount of the M-th seismic trace gather, wherein K−2≥M≥1 and M is an integer;

sliding the time window in the predetermined time range, calculating a correlation coefficient of a (K+1)-th seismic trace gather with the K-th seismic trace gather, selecting the time window as an optimum point when the correlation coefficient is the maximum, and taking a time shifting amount corresponding to the optimum point as a residual NMO correction amount of the (K+1)-th seismic trace gather;

sliding the time window in the predetermined time range, calculating a correlation coefficient of an (N+1)-th seismic trace gather with an N-th seismic trace gather, selecting the time window as an optimum point when the correlation coefficient is the maximum, and taking a time shifting amount corresponding to the optimum point as a residual NMO correction amount of the (N+1)-th seismic trace gather, wherein S−1≥N≥K+1 and N is an integer, and the time shifting amount corresponding to the optimum point is a difference value between seismic reflection time of a seismic trace gather (e.g., the (N+1)-th seismic trace gather herein) in the time window and seismic reflection time of a seismic trace gather with an offset of 0;

performing a residual NMO correction of the S seismic trace gathers using the calculated residual NMO correction amounts of the S seismic trace gathers.

In the embodiment, the processor 402 further performs the following operations when executing the computer program:

employing the following formula to stack the seismic trace gathers to obtain the model trace:

$$A_j = \sum_{i=m1}^{m2} a_{ij}$$

In which, m1 and m2 denote serial numbers of the seismic trace gathers, and $a_{ij}$ denotes an amplitude value of a j-th sampling point of an i-th trace; m1, m2, i and j are all positive integers, 1≤m1<m2≤S, i∈[m1, m2].

In the embodiment, the processor 402 further performs the following operations when executing the computer program:

employing the following formula to calculate a correlation coefficient of a model trace $\overline{A}$ with a seismic trace gather $\overline{B}$:

$$\overline{rx} = \frac{\sum_{j=1}^{n}(a_j - Aa)(b_j - Ba)}{\sqrt{\sum_{j=1}^{n}(a_j - Aa)^2 \sum_{j=1}^{n}(b_j - Ba)^2}}$$

In which, $\overline{rx0}$ denotes a correlation coefficient of an x-th trace with the model trace, $a_j$ denotes an amplitude value of an j-th sampling point of the model trace $\overline{A}$, Aa denotes an average amplitude value of the model trace $\overline{A}$, $b_j$ denotes an amplitude value of an j-th sampling point of the seismic trace gather $\overline{B}$, Ba denotes an average amplitude value of the seismic trace gather $\overline{B}$, and n denotes the total number of sample points in the seismic trace gathers, wherein n, x and j are both positive integers, and 1≤x≤S.

In the embodiment, the processor 402 further performs the following operations when executing the computer program: stacking seismic trace gathers in a predetermined range among S seismic trace gathers after an NMO correction processing to obtain a model trace, S being an integer; calculating a correlation coefficient of each seismic trace gather with the model trace, and selecting a K-th seismic trace gather with a maximum correlation coefficient; calculating an optimum point of each seismic trace gather from the K-th seismic trace gather to two sides orderly; performing a residual NMO correction of the seismic trace gathers according to the optimum points.

In the embodiment, the processor 402 further performs the following operations when executing the computer program: sliding a time window in a predetermined time range, calculating a correlation coefficient of a (K−1)-th seismic trace gather with the K-th seismic trace gather, selecting the time window as an optimum point when the correlation coefficient is the maximum, and taking a time shifting amount corresponding to the optimum point as a residual NMO correction amount of the (K−1)-th seismic trace gather, wherein K>1 and K is an integer; sliding the time window in the predetermined time range, calculating a correlation coefficient of an M-th seismic trace gather with an (M+1) seismic trace gather, selecting the time window as an optimum point when the correlation coefficient is the maximum, and taking a time shifting amount corresponding to the optimum point as a residual NMO correction amount of the M-th seismic trace gather, wherein K−2≥M≥1 and M is an integer; sliding the time window in the predetermined time range, calculating a correlation coefficient of a (K+1)-th seismic trace gather with the K-th seismic trace gather, selecting the time window as an optimum point when the correlation coefficient is the maximum, and taking a time shifting amount corresponding to the optimum point as a residual NMO correction amount of the (K+1)-th seismic trace gather; sliding the time window in the predetermined time range, calculating a correlation coefficient of an (N+1)- th seismic trace gather with an N-th seismic trace gather, selecting the time window as an optimum point when the correlation coefficient is the maximum, and taking a time shifting amount corresponding to the optimum point as a residual NMO correction amount of the (N+1)-th seismic trace gather, wherein S−1 and N is an integer, and the time shifting amount corresponding to the optimum point is a difference value between seismic reflection time of a seismic trace gather in the time window and seismic reflection time of a seismic trace gather with an offset of 0.

In the embodiment, the processor 402 further performs the following operations when executing the computer program: performing a residual NMO correction of the S seismic trace gathers using the calculated residual NMO correction amounts of the S seismic trace gathers.

In the embodiment, the processor 402 further performs the following operations when executing the computer program: performing an amplitude energy equalization processing of each seismic trace gather before stacking seismic trace gathers in a predetermined range among S seismic trace gathers after an NMO correction processing; stacking the seismic trace gathers in the predetermined range among the S seismic trace gathers after the NMO correction processing to obtain a model trace, S being an integer; calculating a correlation coefficient of each seismic trace gather with the model trace, and selecting a K-th seismic trace gather with a maximum correlation coefficient; calculating an optimum point of each seismic trace gather from the K-th seismic trace gather to two sides orderly; performing a residual NMO correction of the seismic trace gathers according to the optimum points.

The embodiments of the present disclosure further provide a computer readable storage medium, wherein the computer readable storage medium stores a computer program which causes the processor to perform the following operations when being executed:

stacking seismic trace gathers in a predetermined range among S seismic trace gathers after a Normal Move Out (NMO) correction processing to obtain a model trace, S being an integer;

calculating a correlation coefficient of each seismic trace gather with the model trace, and selecting a K-th seismic trace gather with a maximum correlation coefficient;

calculating an optimum point of each seismic trace gather from the K-th seismic trace gather to two sides orderly;

performing a residual NMO correction of the seismic trace gathers according to the optimum points.

In the embodiment, the computer program further causes the processor to perform the following operations when being executed:

sliding a time window in a predetermined time range, calculating a correlation coefficient of a (K−1)-th seismic trace gather with the K-th seismic trace gather, selecting the time window as an optimal point when the correlation coefficient is the maximum, and taking a time shifting amount corresponding to the optimal point as a residual NMO correction amount of the (K−1)-th seismic trace gather, wherein K>1 and K is an integer;

sliding the time window in the predetermined time range, calculating a correlation coefficient of an M-th seismic trace gather with an (M+1) seismic trace gather, selecting the time window as an optimal point when the correlation coefficient is the maximum, and taking a time shifting amount corresponding to the optimal point as a residual NMO correction amount of the M-th seismic trace gather, wherein K−2≥M≥1 and M is an integer;

sliding the time window in the predetermined time range, calculating a correlation coefficient of a (K+1)-th seismic trace gather with the K-th seismic trace gather, selecting the time window as an optimal point when the correlation coefficient is the maximum, and taking a time shifting amount corresponding to the optimal point as a residual NMO correction amount of the (K+1)-th seismic trace gather; and sliding the time window in the predetermined time range, calculating a correlation coefficient of an (N+1)-th seismic trace gather with an N-th seismic trace gather, selecting the time window as an optimum point when the correlation coefficient is the maximum, and taking a time shifting amount corresponding to the optimum point as a residual NMO correction amount of the (N+1)-th seismic trace gather, wherein S−1≥N≥K+1 and N is an integer, and the time shifting amount corresponding to the optimum point is a difference value between seismic reflection time of a seismic trace gather in the time window and seismic reflection time of a seismic trace gather with an offset of 0.

In the embodiment, the computer program further causes the processor to perform the following operations when being executed:

performing a residual NMO correction of the S seismic trace gathers using the calculated residual NMO correction amounts of the S seismic trace gathers.

In the embodiment, the computer program further causes the processor to perform the following operations when being executed:

employing the following formula to stack the seismic trace gathers to obtain the model trace:

$$A_j = \Sigma_{i=m1}^{m2} a_{ij};$$

wherein m1 and m2 denote serial numbers of the seismic trace gathers, and $a_{ij}$ denotes an amplitude value of a j-th sampling point of an i-th trace; m1, m2, i and j are all positive integers, $1 \leq m1 < m2 \leq S$, $i \in [m1, m2]$.

In the embodiment, the computer program further causes the processor to perform the following operations when being executed:

employing the following formula to calculate a correlation coefficient of a model trace $\overline{A}$ with a seismic trace gather $\overline{B}$:

$$\overline{rx} = \frac{\sum_{j=1}^{n}(a_j - Aa)(b_j - Ba)}{\sqrt{\sum_{j=1}^{n}(a_j - Aa)^2 \sum_{j=1}^{n}(b_j - Ba)^2}};$$

wherein $\overline{rx}$ denotes a correlation coefficient of an x-th trace with the model trace, $a_j$ denotes an amplitude value of an j-th sampling point of the model trace $\overline{A}$, Aa denotes an average amplitude value of the model trace $\overline{A}$, $b_j$ denotes an amplitude value of an j-th sampling point of the seismic trace gather $\overline{B}$, Ba denotes an average amplitude value of the seismic trace gather $\overline{B}$, and n denotes the total number of sample points in the seismic trace gathers; n, x and j are both positive integers, and $1 \leq x \leq S$.

In the embodiment, the computer program further causes the processor to perform the following operations when being executed:

performing an amplitude energy equalization processing of each seismic trace gather before stacking seismic trace gathers in a predetermined range among S seismic trace gathers after an NMO correction processing to obtain a model trace.

In the embodiment, the computer program further causes the processor to perform the following operations when being executed:

counting an amplitude energy E0 in a predetermined time window range:

$$E0 = \frac{1}{Q}\left(\sum_{i=1}^{Q} \sqrt{\frac{1}{P}\sum_{j=1}^{P} a_j^2}\right)$$

wherein Q denotes the number of counted traces, P denotes the number of sampling points, and $a_j$ denotes an amplitude value;

calculating an amplitude energy E1 of each seismic trace gather:

$$E1 = \sqrt{\frac{1}{P}\sum_{j=1}^{P} a_j^2}$$

calculating an amplitude equalization coefficient k of each seismic trace gather:

$$k = E0/E1$$

performing an amplitude equalization processing of each seismic trace gather using the amplitude equalization coefficient:

$$\overline{A}' = k\overline{A}$$

wherein $\overline{A}$ denotes a sequence composed of amplitude values a of each seismic trace gather, and $\overline{A}'$ denotes an amplitude value after the amplitude equalization processing.

The embodiment of the present disclosure stacks a plurality of seismic trace gathers; calculates a correlation coefficient of each seismic trace gather with a model trace, and selects a K-th seismic trace gather; calculates an optimum point of each seismic trace gather from the K-th seismic trace gather to two sides orderly; and performs a residual NMO correction of the seismic trace gathers according to the optimum points. This solution is combined with the prior art which realizes an NMO correction processing by analyzing the seismic propagation velocities, so that events of all of the model trace gathers are corrected into a horizontal state, thereby eliminating the errors caused by the interpolation in the prior art, and improving the accuracy of the prestack NMO correction; thus the quality of the seismic data stack result after the trace gather optimization is obviously improved or increased, which can more accurately describe the stratum construction, the lithology and the fluid property.

A person skilled in the art will appreciate that all or a part of the steps of those embodiments may be completed by hardware, or by instructing relevant hardware through a program that may be stored in a computer readable storage medium or other non-transitory medium such as a read-only memory, a magnetic disk or an optical disk.

Those described above are just preferred embodiments of the present disclosure, rather than limitations thereto. Any amendment, equivalent replacement, improvement, etc. made within the spirit and principle of the present disclosure shall fall within the protection scope of the present disclosure.

The invention claimed is:

1. A method for determining properties of geological strata below a surface, comprising:

propagating seismic waves through the surface;

recording reflection or refraction waves returned to the surface from a location below the surface at a plurality of locations, wherein the reflection or refraction waves comprise a seismic trace gather;

stacking seismic trace gathers in a predetermined range among S seismic trace gathers after a Normal Move Out (NMO) correction processing to obtain a model trace, S being an integer;

calculating a correlation coefficient of each seismic trace gather with the model trace, and selecting a K-th seismic trace gather with a maximum correlation coefficient;

calculating an optimum point of each seismic trace gather from the K-th seismic trace gather to two sides orderly and by:

sliding a time window in a predetermined time range, calculating a correlation coefficient of a (K−1)-th seismic trace gather with the K-th seismic trace gather, selecting the time window as an optimal point when the correlation coefficient is the maximum, and taking a time shifting amount corresponding to the optimal point as a residual NMO correction amount of the (K−1)-th seismic trace gather, wherein K>1 and K is an integer;

sliding the time window in the predetermined time range, calculating a correlation coefficient of an M-th seismic trace gather with an (M+1) seismic trace gather, selecting the time window as an optimal point when the correlation coefficient is the maximum, and taking a time shifting amount corresponding to the optimal point as a residual NMO correction amount of the M-th seismic trace gather, wherein K−2≥M≥1 and M is an integer;

sliding the time window in the predetermined time range, calculating a correlation coefficient of a (K+1)-th seismic trace gather with the K-th seismic trace gather, selecting the time window as an optimal point when the correlation coefficient is the maximum, and taking a time shifting amount corresponding to the optimal point as a residual NMO correction amount of the (K+1)-th seismic trace gather; and sliding the time window in the predetermined time range, calculating a correlation coefficient of an (N+1)-th seismic trace gather with an N-th seismic trace gather, selecting the time window as an optimum point when the correlation coefficient is the maximum, and taking a time shifting amount corresponding to the optimum point as a residual NMO correction amount of the (N+1)-th seismic trace gather, wherein S−1≥N≥K−1 and N is an integer, and the time shifting amount corresponding to the optimum point is a difference value between seismic reflection time of a seismic trace gather in the time window and seismic reflection time of a seismic trace gather with an offset of 0;

performing a residual NMO correction of the seismic trace gathers according to the optimum points to create corrected seismic trace gathers; and determining depth, lithology, or fluid properties of the geological strata below the surface with the corrected seismic trace gathers.

2. The method according to claim 1, wherein performing a residual NMO correction of the seismic trace gathers according to the optimum points comprises:

performing a residual NMO correction of the S seismic trace gathers using the calculated residual NMO correction amounts of the S seismic trace gathers.

3. The method according to claim 1, wherein stacking seismic trace gathers in a predetermined range among S seismic trace gathers after an NMO correction processing to obtain a model trace comprises:

employing the following formula to stack the seismic trace gathers to obtain the model trace:

$A_j = \Sigma_{i=m1}^{m2} a_{ij}$ wherein m1 and m2 denote serial numbers of the seismic trace gathers, and $a_{ij}$ denotes an amplitude value of a j-th sampling point of an i-th trace; m1, m2, i and j are all positive integers, $1 \leq m1 < m2 \leq S$, $i \in [m1, m2]$.

4. The method according to claim 1, wherein calculating a correlation coefficient of each seismic trace gather with the model trace comprises:

employing the following formula to calculate a correlation coefficient of a model trace $\overline{A}$ with a seismic trace gather $\overline{B}$:

$$\overline{rx} = \frac{\sum_{j=1}^{n}(a_j - Aa)(b_j - Ba)}{\sqrt{\sum_{j=1}^{n}(a_j - Aa)^2 \sum_{j=1}^{n}(b_j - Ba)^2}};$$

wherein $\overline{rx}$ denotes a correlation coefficient of an x-th trace with the model trace, $a_j$ denotes an amplitude value of an j-th sampling point of the model trace $\overline{A}$, Aa denotes an average amplitude value of the model trace $\overline{A}$, $b_j$ denotes an amplitude value of an j-th sampling point of the seismic trace gather $\overline{B}$, Ba denotes an average amplitude value of the seismic trace gather $\overline{B}$, and n denotes the total number of sample points in the seismic trace gathers; n, x and j are both positive integers, and $1 \leq x \leq S$.

5. The method according to claim 1, wherein before stacking seismic trace gathers in a predetermined range among S seismic trace gathers after an NMO correction processing to obtain a model trace, the method further comprises:

performing an amplitude energy equalization processing of each seismic trace gather.

6. The method according to claim 5, wherein performing an amplitude energy equalization processing of each seismic trace gather comprises:

counting an amplitude energy E0 in a predetermined time window range:

$$E0 = \frac{1}{Q}\left(\sum_{i=1}^{Q}\sqrt{\frac{1}{P}\sum_{j=1}^{P}a_j^2}\right)$$

wherein Q denotes the number of counted traces, P denotes the number of sampling points, and $a_j$ denotes an amplitude value;

calculating an amplitude energy E1 of each seismic trace gather:

$$E1 = \sqrt{\frac{1}{P}\sum_{j=1}^{P}a_j^2}$$

calculating an amplitude equalization coefficient k of each seismic trace gather:

$k = E0/E1$ performing an amplitude equalization processing of each seismic trace gather using the amplitude equalization coefficient:

$\overline{A}' = k\overline{A}$ wherein $\overline{A}$ denotes a sequence composed of amplitude values a of each seismic trace gather, and $\overline{A}'$ denotes an amplitude value after the amplitude equalization processing.

* * * * *